Sept. 2, 1969 R. N. HILL ET AL 3,465,165

MAGNETIC SWITCH

Filed Nov. 18, 1963 3 Sheets-Sheet 1

INVENTOR
WILLIAM J. BARTIK
RICHARD N. HILL

BY David Teacline

ATTORNEY

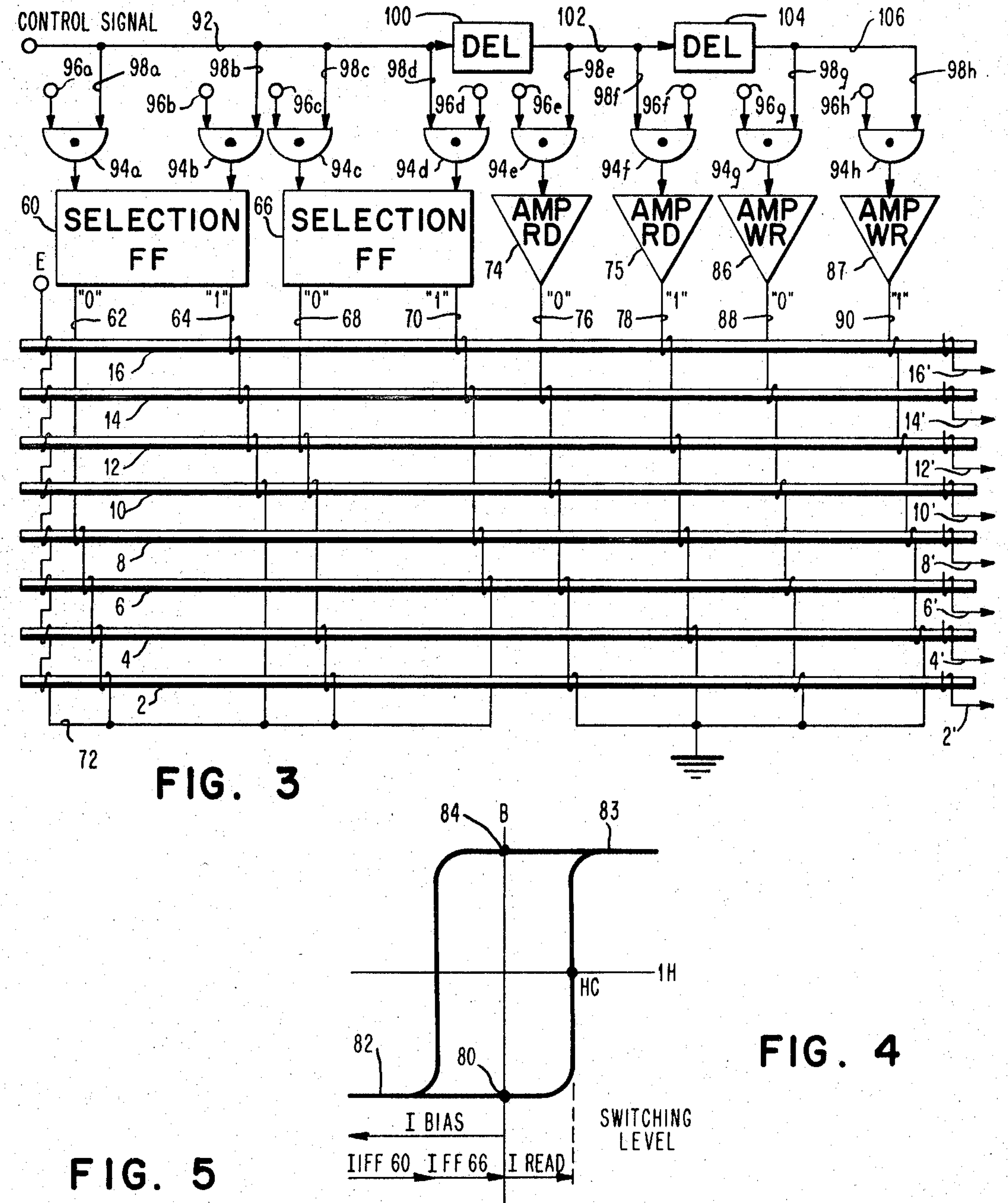
FIG. 3, FIG. 4, FIG. 5
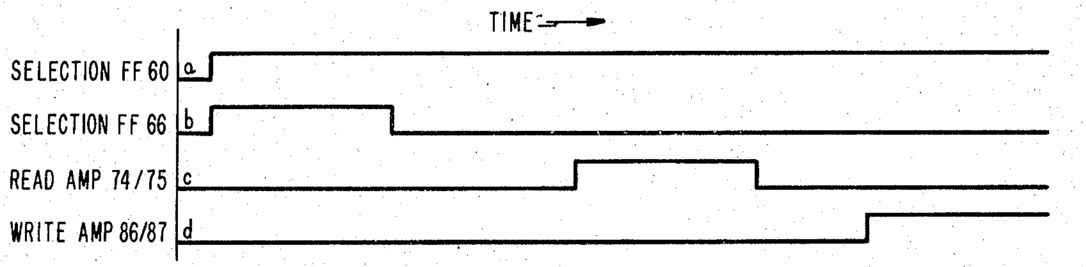

3,465,165
MAGNETIC SWITCH

Richard Norman Hill, Philadelphia, and William John Bartik, Jenkintown, Pa., assignors to Sperry Rand Corporation, New York, N.Y., a corporation of Delaware Filed Nov. 18, 1963, Ser. No 324,365
Int. Cl. H03k *17/80*
U.S. Cl. 307—88 6 Claims

ABSTRACT OF THE DISCLOSURE

This invention relates to a selection circuit whereby a group of selection flip-flops, which are less than the number required to completely select and switch a core are employed to partially select a desired core and to provide the bias to all undesired cores. In this manner, should the outputs of the selection flip-flops vary, the DC bias will also vary maintaining the desired relationship between the bias and selection currents. An amplifier is then provided to complete the selection and switching of the desired core.

This invention relates to magnetic switch arrays and memories and more particularly to improvements in such magnetic switch arrays and memories wherein the switching of individual switching elements is controlled by a combination of selection devices and amplifiers permitting the use of simpler, less critical and inexpensive selection devices and amplifiers.

Magnetic switching arrays and memories wherein single switching elements or a combination thereof may be selected to perform switching, control or memory functions have long been known in the prior art. These arrays and memories employ magnetic switching elements constructed from ferromagnetic materials showing the well known square hysteresis characteristic. These ferromagnetic materials may remain in either of two stable magnetic remanent states and can be switched from a first of these stable magnetic remanent states (e.g. the negative magnetic remanent state) to the second stable magnetic remanent state (e.g. the positive magnetic remanent state) if a signal of proper amplitude and polarity is applied to the windings placed upon the ferromagnetic material. The amplitude of the applied signal must exceed any of bias signals applied plus the critical value of magnetic intensity (H*c*) required to switch the material from the first to second stable magnetic remanent state. The value of H*c* will depend upon the particular ferromagnetic material employed and the geometry of the switching element, and will be the same for each direction of switching, that is from negative to positive or positive to negative magnetic remanent state. Signals of less amplitude than that required to switch the material will disturb the magnetic state of the material as long as the signal is applied and return to its former stable magnetic remanent state as soon as the signal is removed. The polarity of the applied signal should be opposite to the polarity of the magnetic remanent state of the material to cause switching. A signal of the same polarity as the polarity of the magnetic remanent state of the material will merely drive the material towards magnetic saturation. Upon removal of such a similar polarity signal, the material will return from its saturation position to its previous stable magnetic remanent state.

The ferromagnetic material may be formed into cores, rods or any other convenient shape to be employed as the switching elements of the array. As is consistent with prior art usage, the term core will be employed throughout to refer to the switching elements, regardless of their particular geometric form.

Magnetic switch arrays and memories of the prior art employed a plurality of flip-flops for selection devices and a DC source to provide the required bias. Each of the selection flip-flops were arranged to provide a proportionate part of the current required to produce a field in excess of the applied bias field and the value of H*c* for the particular ferromagnetic material employed as the switching cores. The bias value was sufficient to prevent the switching of any core which was not intended to be switched. For example, if a magnetic switching array having eight cores is assumed and it is desired to select and switch a single core, then three selection flip-flops are employed (giving selection of any one of the eight cores) each providing approximately one third of the required switching current. The DC bias provided sufficient opposition current to prevent the switching of any core receiving less than the current from all three selection flip-flops.

To permit this manner of operation, the selection flip-flops, which might be vacuum tubes, transistor or magnetic amplifier devices, and the DC bias source, had to be carefully controlled within established upper and lower current limits. For example, for a selected value of DC bias applied to all the switching cores, such bias tending to prevent the switching of the cores, it is necessary that the sum total of the current supplied by the selection flip-flops to the desired switching core exceed the value of the DC bias plus the value of H*c* of the core. Additionally, the selection flip-flop currents must be of such values that it is not possible for the current from a single one or combination of two selection flip-flops to exceed the limits of the DC bias and the critical value H*c* of the core and cause it to be switched. Thus the upper selection current limit is established to be nominally one-third of the value of the required switching current of a core. The lower selection current limit established by the above criteria, is such that the output currents of all selection flip-flops must total the value of current necessary to overcome the DC bias and the value H*c* of the core. To meet these current limits, the prior art devices resorted to expensive, accurately held flip-flop devices and carefully regulated DC current bias supplies. These devices greatly added to the cost of the switching array and required constant maintenance to insure the relative values of the DC bias current and the selection flip-flop currents remain constant.

The employment of the novel techniques of the present invention permit the simplification and reduction in cost of magnetic switching arrays. These desirable results are achieved by the unique employment of flip-flops which may have poorer output characteristics and having only a single defined current limit, along with the replacement of previously required flip-flops with amplifiers having only a single defined current limit and the complete elimination of a DC current bias source. In a first embodiment, a group of selection flip-flops, less than the number required to completely select and switch a core, are employed to partially select a desired core and to provide the bias to all undesired cores. In this manner, should the outputs of the selection flip-flops vary, the DC bias will also vary maintaining the desired relationship between the bias and selection currents. An amplifier is then provided to complete the selection and switching of the desired core. The flip-flops in this arrangement, as well as the amplifier, will only have established lower limits such that the amplifier can not by itself switch any core. The upper imits are removed, since the DC bias will always equal the selection flip-flop outputs. A further amplifier, also with a defined current will be provided to reswitch the previously switched core to preserve the stored information. The outputs of the selection flip-flops and amplifiers are properly timed and controlled such that the read out and write functions do not overlap.

In a second embodiment, the selection flip-flops are employed to provide inhibiting current to the cores to inhibit all non-selected cores while retaining the selected core at its original stable magnetic remanent state. An amplifier is provided to complete the selection and switching of the desired core, by providing switching current to switch the core retained at the stable state but not sufficient to switch any inhibited core. A further amplifier is required to reswitch any selected and switched core. In this embodiment the selection flip-flops and amplifiers will have only a single defined current limit, that is a lower limit. An inductance is provided in the supply line to the selection flip-flops to permit the use of cheaper lower output power flip-flops while providing a high impedance for any back EMF's induced in the core windings as a result of switching. Sequence and timing controls are provided as with the embodiment described above.

It is an object of this invention to provide improved forms of magnetic switching arrays and memories.

It is another object of this invention to provide improved forms of magnetic switching arrays and memories which employ simpler, cheaper, and less accurate selection devices to perform the necessary switching functions.

It is yet another object of this invention to provide improved forms of magnetic switching arrays and memories which employ simpler, cheaper and less accurate selection flip-flops and amplifiers to permit switching and restoration of selected switching cores.

It is still another object of this invention to provide an improved form of magnetic switching array and memory in which the bias for the array is provided by means of the selection flip-flops themselves.

It is yet another object of this invention to provide an improved form of magnetic switching array and memory, wherein the need for a bias winding upon the switching cores is eliminated.

Another object of this invention is to provide an improved form of magnetic switching array and memory wherein selection flip-flops and amplifiers having a single defined limit are employed.

Further objects and features of the invention will be pointed out in the following description and claims, and illustrated in the accompanying drawings, which disclose, by way of example, the principles of the invention and the best modes which have been contemplated for carrying it out.

In the drawings:

FIGURE 3 is a first embodiment of a magnetic switching device constructed in accordance with the basic concepts of this invention;

FIGURE 4 is a hysteresis diagram for one of the cores of FIGURE 3, illustrating the manner in which switching is accomplished;

FIGURE 5 is a timing diagram illustrating the application of the selection and control signals required for the operation of the array of FIGURES 3 and 6;

Similar elements are given similar reference characters in each of the respective figures.

Figure 1:
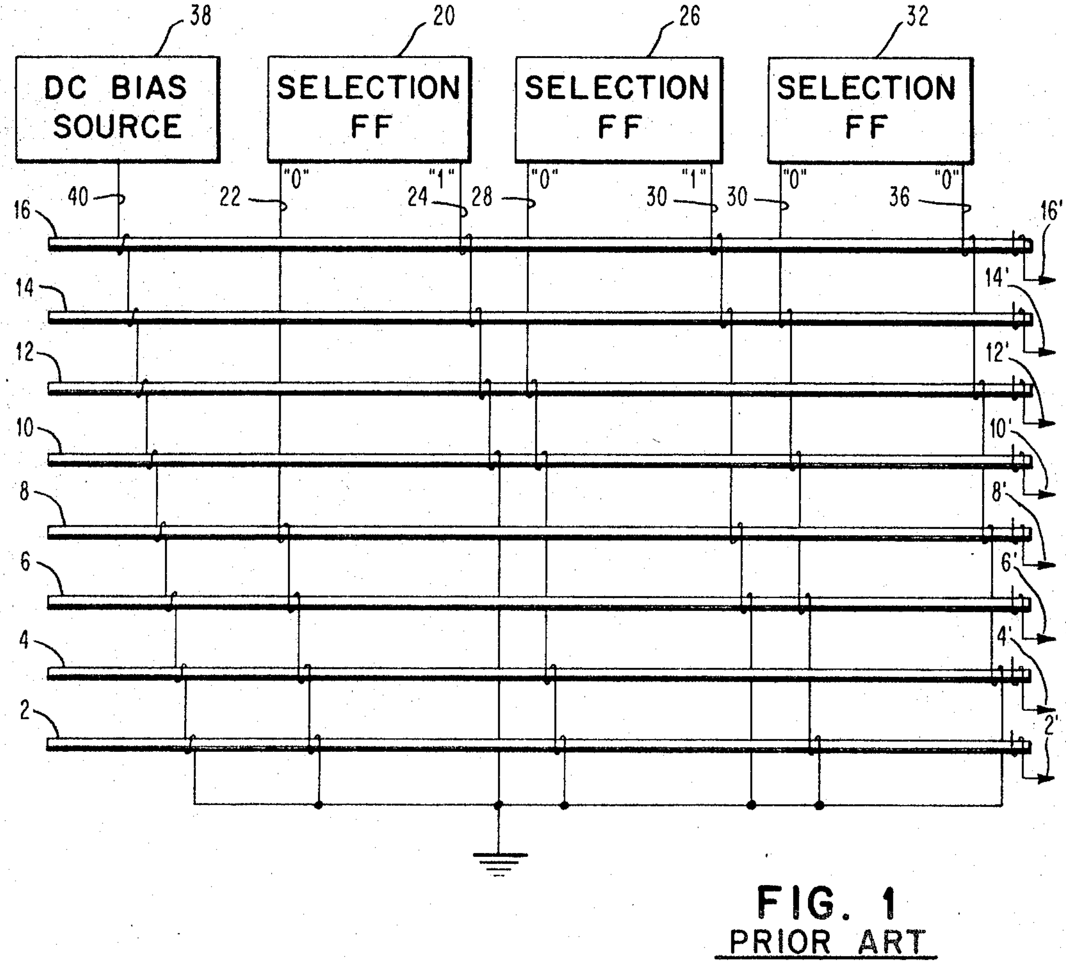
FIG. 1 PRIOR ART
FIGURE 1 illustrates a representative form of prior art magnetic switching arrays over which this invention is an improvement.

Turning now to FIGURE 1, there is illustrated a magnetic switching array representative of many forms of such arrays found in the prior art. The magnetic switching array consists of eight magnetic cores designated 2, 4, 6, 8, 10, 12, 14 and 16. Selection of a single core out of the eight cores is accomplished by means of three selection flip-flops 20, 26 and 32 which each provide one third of the required selection current. A DC bias source 38 is provided to apply a current equal approximately to two thirds of the total selection current required to switch a core. The DC bias will thus insure that only the core receiving switching current from all three of the selection flip-flops 20, 26 and 32 will be switched.

The selection flip-flop 20 is coupled on its zero output side by means of a line 22 to windings on the cores 2, 4, 6 and 8 whereas the one output side is coupled by means of line 24 to the windings on cores 10, 12, 14 and 16. Selection flip-flop 26 is coupled on its zero output side to the windings on cores 2, 4, 10 and 12 by the line 28. The line 30 couples the one output side of selection flip-flop 26 to the winding on the cores 6, 8, 14 and 16. Finally selection flip-flop 32 is coupled on its zero side by line 34 to the windings on cores 2, 6, 10 and 14 and on its one side by line 36 to the windings on the cores 4, 8, 12 and 16. The DC bias source 38 is coupled to a winding on each one of cores 2, 4, 6, 8, 10, 12, 14 and 16 by means of a line 40. The windings which supply the bias to the cores are wound oppositely to the windings which supply the selection current. Therefore, for applied selection currents and DC bias currents of the same polarity, the effect of the DC bias current is opposite to the effect of the selection currents. For example, if a core is assumed to be in the stable negative magnetic remanent state, the selection currents will tend to switch the core to the stable positive magnetic remanent state, whereas the DC bias current will tend to drive the core toward negative saturation. An output winding is provided each core to permit the signal read out of the core as a result of switching to be further employed. The output windings 2', 4', 8', 10', 12', 14' and 16' are respectively wound about the cores 2, 4, 6, 8, 10, 12, 14 and 16.

To select a particular core, the selection flip-flops 20, 26 and 32 are set to their one or zero states by gates (not shown) in accordance with a desired input code, for example the binary code. The flip-flops will put out the same value of current on either output line depending upon which state the flip-flop is in. Thus in the zero state, the zero line may provide .5 amp and the one line provide zero amp. In the one state, the values are reversed. If it is desired to select core 8, then the selection flip-flops 20, 26 and 32 would be set to their zero, one, one states respectively. Core 8 would then be the only core to have all three selection current portions applied to it and would be able to overcome the bias applied and switch, producing an output in winding 8'.

As stated above, the selection flip-flops and DC bias source must be carefully controlled within fixed limits so that the core receiving three selection current portions is the only one switched and that the combined currents are sufficient to switch the desired core.

Figure 2:
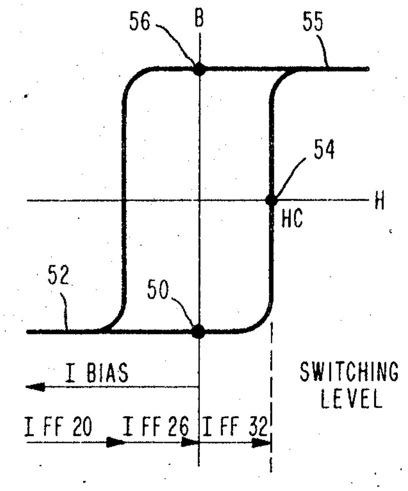
FIG. 2 PRIOR ART
FIGURE 2 is a hysteresis diagram for one of the cores of FIGURE 1, illustrating the manner in which switching is accomplished.

Turning now to FIGURE 2, a hysteresis diagram illustrating the manner of switching of core 8 of FIGURE 1 is shown. Assuming that the magnetic core 8 is initially at the stable negative magnetic remanent state, indicated at point 50, the application of the bias current from source 38, will tend to drive the magnetic state of the core 8 towards negative saturation in the region designated 52. The application of selection current from selection flip-flop 20 will tend to move the magnetic state from the saturation region 52 towards the stable negative magnetic remanent state 50. The application of selection current from the selection flip-flop 26 will tend to move the magnetic state of the core 8 back to the stable negative magnetic remanent state 50. The current from selection flip-flop 32 will switch the core 8 from the stable negative magnetic remanent state, beyond the value Hc to the positive saturation region 55. Upon the termination of the selection currents, the magnetic state will move to the stable positive magnetic remanent state 56. A write device (not shown) would then be employed to set the core to a desired stable magnetic remanent state in accordance with the data to be stored. Although the switching of core 8 has been described sequentially for the sake of illustrative clarity, it should be understood that these events are simultaneous.

Referring now to FIGURE 3, the first embodiment of the magnetic switching array constructed in accordance with the concepts of this invention is illustrated. Again it is seen that eight switching cores 2, 4, 6, 8, 10, 12, 14 and 16 are provided. It should be understood that eight switching cores are shown for illustrative purposes only, and are not considered to limit the inveition in any way. It should be obvious that this device may be extended to as many switching elements as are desired or reduced accordingly. Increases and decreases in the number of selection devices will have to be made accordingly.

In general, the switching array of FIGURE 3, operates in the following manner. Two selection flip-flops are provided to partially select a desired core, but fail to provide sufficient current to switch the core. The selection lines are connected together and in turn are connected to the bias windings upon the cores. In this manner, the bias current applied to the cores, will remain equal to the total selection current and any variation in selection current will be matched by a corresponding variation in the bias current. Final selection of a core is accomplished by means of a read amplifier which is employed to supply the final one third of the selection and switching current. The core is then returned to a desired state by means of a write amplifier actuated after readout has been completed. In this arrangement, the only limitation placed upon the currents supplied by the selection flip-flops and amplifiers is a lower one. That is the selection flip-flops must provide at least a value of current equal to the read current provided by the read amplifier, so that the read amplifier cannot switch a core by itself. Thus, if a core receives only one selection current, the read current cannot cause the core to be switched. The read amplifier current limit is such that a read out signal of the core must be at a useful level, while the write amplifier current must be of sufficient level to reswitch the switched core if desired.

More particularly, the windings of the cores 2, 4, 6 and 8 of FIGURE 3 are coupled to selection flip-flop 60 on its zero side by the line 62. The one side of selection flip-flop 60 is coupled to the windings on the cores 10, 12, 14 and 16 by means of line 64. Selection flip-flop 66 is coupled on its zero side to the windings on cores 2, 4, 10 and 12 by line 68 and on its one side by line 70 to the windings on cores 6, 8, 14 and 16. The selection lines 62, 64, 68 and 70 are connected to a line 72, which connects the bias windings upon the cores 2, 4, 6, 8, 10, 12 and 14 and 16 to a source of potential E. The bias windings are oppositely wound with respect to the selection windings and will cause a core in the stable negative magnetic remanent state to be driven to the negative saturation region with a signal of the same polarity as would drive the core to the positive saturation area if applied to the selection windings. The two sets of selection windings provide two thirds of the required switching current to a selected core, holding it at the original negative stable state while all other cores are biased towards the negative saturation region.

The final selection of a core is accomplished by means of a pair of read amplifiers 74 and 75. The read amplifier 74, corresponding to the zero selection digit, is coupled to windings on the cores 2, 6, 10, 14 by a line 76 while the read amplifier 75, corresponding to the one selection digit is coupled to winding on the cores 4, 8, 12 and 16 by a line 78. Actuation of one or the other of the amplifiers 74 and 75, in a manner to be described below, provides the final one third of the selection current to switch a desired core.

After the core has been switched, a pair of write amplifiers 86 and 87 are employed to write into the switched core desired data. The write amplifier 86, corresponding to the zero write-in digit, is coupled to windings on the cores 2, 6, 10 and 14 by means of line 88, while line 90 is used to couple the windings on the cores 4, 8, 12 and 16 to the one write-in digit. The windings of read amplifier 74 and write amplifier 86 are placed upon the same cores but are oppositely wound to produce the desired read and write functions. The same is true of the windings coupled to read amplifier 75 and write amplifier 87. Output windings 2', 4', 6', 8', 10', 12', 14' and 16' are provided on the cores 2, 4, 6, 8, 10, 12, 14 and 16 to couple the outputs to using devices (not shown).

The setting of the selection flip-flops 60 and 66 and the control of the read and write amplifiers 74, 75 and 86, 87 is accomplished by means of a series of two input "and" gates **94*a* through *h*. A first input 96*a* through *f* of the "and" gates 94*a* through *f* is connected to a matrix (not shown) to set the selection flip-flops 60 and 66 and the read amplifiers 74 and 75 according to the particular core desired to be switched. Inputs 96*g* and *h* are set by the write control (not shown) to determine whether a one or zero will be written into a previously switched core. The second inputs 98*a* through *d* of "and" gates 94*a* through *d* are connected to a control line 92** which receives control signals from a source (not shown) which may be a computer, data processing device, or the like.

The control signal on line 92 is also fed to a delay element 100, of sufficient duration to prevent the application of a signal to the line 102 until the cores have settled down from the application of the selection currents. Upon leaving the delay 100, the control signal will be applied to inputs **98*e* and 98*f* of "and" gates 94*e* and *f* to complete the core selection and to the delay unit 104. Delay 104 is of sufficient duration to permit read out of the core before actuation of write amplifiers via line 106. The line 106 is connected to inputs 98*g* and *h* of "and" gates 94*g* and *h* to operate the proper "and" gate 98*d* will pass signals through "and" gates 94*a* and *d* to write amplifiers 86 or 87**.

The relative timing of the selection, read and write signals is shown in FIGURE 5. Lines *a* and *b* show the selection flip-flop 60 and 66 outputs, respectively. It can be seen that these extend for the entire duration of the operation cycle. Line *c* shows the application of the read current by amplifiers 74 or 75, occurring after the start of the selection currents by a time delay equal to delay element 100 and extending for a relatively short duration. Line *d* shows the application of the write current by amplifiers 86 or 87 occurring after the start of the read currents by a time delay equal to delay element 104 and extending for a period equal to the read currents.

The operation of the switching array of FIGURE 3, particularly core 8, will now be described with reference to FIGURES 3 and 4. The selection matrix (not shown) will issue signals to inputs **96*a* and 96*d* which in conjunction with the control signal or line 92 to inputs 98*a* and 98*d* will pass signals through "and" gates 94*a* and *d* to set selection flip-flops 60 to the zero state and selection flip-flop 66 to the one state. Assuming core 8 to be initially at the stable negative magnetic remanent state designated 80, in FIGURE 4, and representing a stored binary one, the application of selection currents by flip-flops 60 and 66 via lines 62 and 70 will hold the core 8 at the point 80 against the equal effects of the bias currents applied via line 72. The remaining non-selected cores will be driven towards the saturation region designated 82. After the control signal has passed through delay 100, input 98*f* of "and" gate 94*f* will receive the second signal to pass a signal from the selection matrix (not shown) via input 96*f* through "and" gate 94*f* to operate read amplifier 75. The output of read amplifier 75 via line 78 provides the required current to core 8 to move it from the stable negative magnetic remanent state past the critical switching value of the core. $Hc$ to the positive saturation region 83 producing an output on output line 8. The remaining cores will be affected but will at best only have their magnetic states return to point 80**.

Upon the termination of the read current the magnetic state of the core 8 will move to the stable positive magnetic remanent state 84. Assuming a one is to be rewritten into core 8, to reswitch it to its former state, a data signal will be applied by the write-in control (not shown) to input **96*h* of "and" gate 94*h*. When the control signal is emitted from delay element 104 and applied to input 98*h* via line 106, "and" gate 94*h* will operate write amplifier 87 to apply write current to the winding on core 8 via line 90** setting the core to the one state, that is returning the core to the stable negative magnetic remanent state.

During the switching of core 8 by the read or write amplifiers, certain back EMF's may be generated which could affect the magnetic state of the other cores. Such effects are prevented by the presence of the bias winding which is wound oppositely to the selection windings, because back EMF's generated would be cancelled by complementary back EMF's generated in the bias windings.

Figure 6:
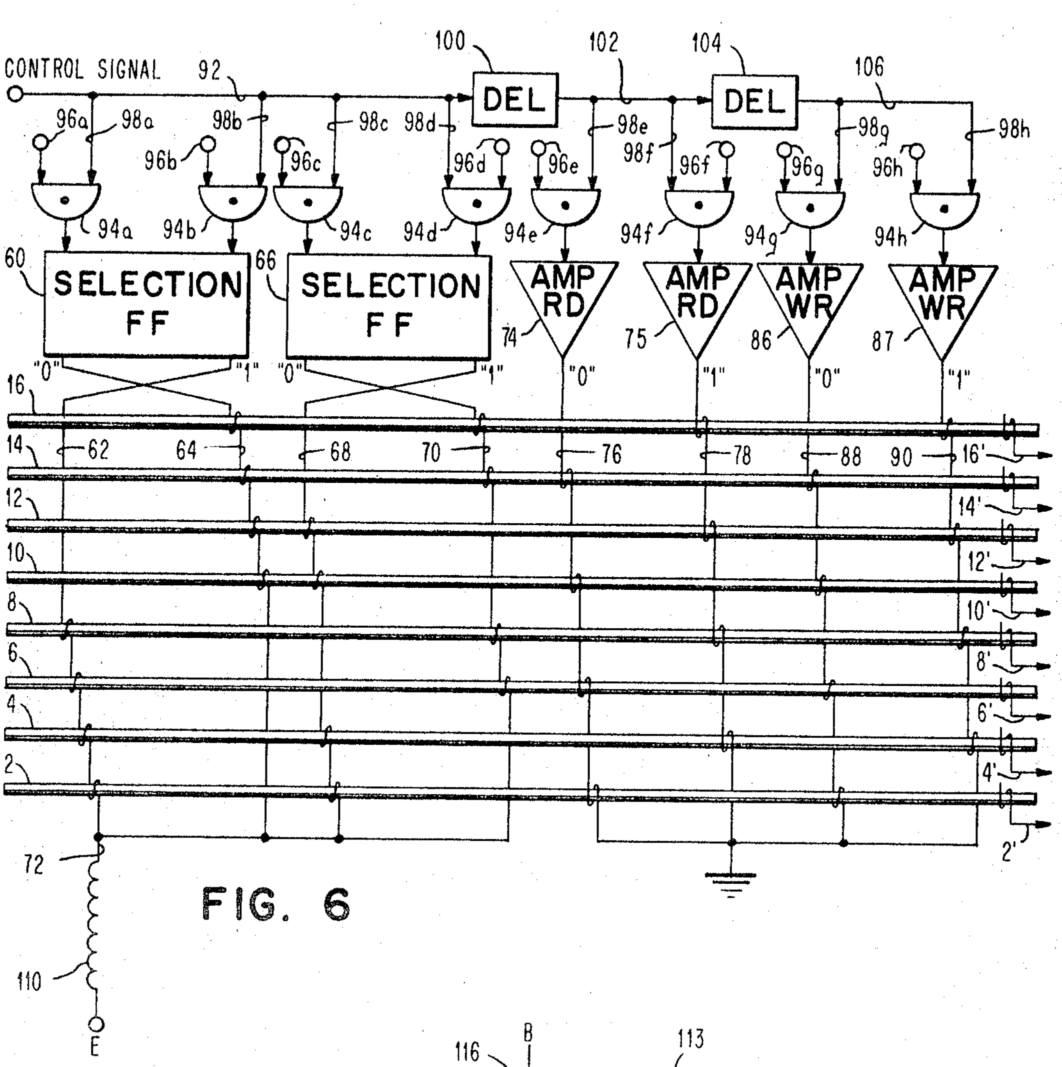
FIGURE 6 is a second embodiment of a magnetic switching array constructed in accordance with the basic concepts of the invention.

FIGURE 6 shows a second embodiment of the magnetic switch array constructed in accordance with the basic concepts of this invention. Structurally the array of FIGURE 6 is similar to FIGURE 3 with the following exceptions. The selection windings on the cores of FIGURE 6 are oppositely wound with respect to the selection windings of FIGURE 3. Thus the application of current by the flip-flops 60 and 66 result in inhibiting the switching of the cores by driving them from the stable negative magnetic remanent state towards negative saturation rather than switching towards positive saturation. Selection line 62 is coupled to the one output of selection flip-flop 60, whereas selection line 64 is coupled to the zero output. Selection lines 68 and 70 of selection flip-flop 66 are similarly reversed. The reason for the reversal of the lines is as follows: Since the selected cores must be left uninhibited, the setting of a selection flip-flop in its one state must result in inhibiting all the lines formerly associated with the zero digit of the selection flip-flop. One final exception to be noted in FIGURE 6 is the complete elimination of a bias winding and the insertion of an inductance coil 110 between the line 72 connecting the selections lines 62, 64, 68 and 70 and the potential source E.

Figure 7:
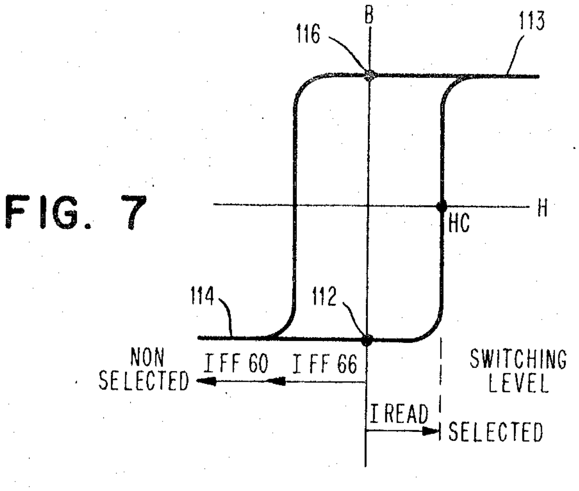
FIGURE 7 is a hysteresis diagram for one of the cores of FIGURE 6, illustrating the manner in which switching is accomplished.

The operation of FIGURE 6 will now be set forth in view of FIGURE 7. Assuming core 8 is selected for readout in the manner described above, and that it was initially in the stable negative remanent state 112, the absence of inhibiting currents from selection flip-flops to core 8 would cause core 8 to remain at the point 112. All non-selected cores would be driven towards the negative saturation region 114 either one unit or two depending upon the number of inhibiting currents applied. FIGURE 7 illustrates a core receiving the inhibiting outputs of selection flip-flops 60 and 66. After delay 100 issues a signal on line 102, the proper read gate, as described above will issue a signal to operate read amplifier 75 which provides a read signal to move the magnetic state of core 8 to the positive saturation region 114. Core 8 then returns to the stable positive magnetic remanent state 116 upon the termination of the read current. The non-selected cores will be effected by the read current but the value of the read current is insufficient to switch any partially inhibited core.

From the foregoing discussion of the embodiment of FIGURE 6, the current limits on the selection devices is made clear. The value of inhibiting current supplied by the flip-flops 60 and 66 must at least be as large as the largest read current provided by the read amplifiers 74 and 75 to prevent the read current from switching a partially inhibited core. There is no upper limit on the inhibiting current provided, since only the unwanted cores are inhibited.

After the information has been read out, a rerecording or switching takes place in a manner analogous to that described with reference to FIGURE 3.

As with the array of FIGURE 3, back EMF's may be developed in the selection windings of the cores as a result of the switching of a core under the influence of a read or write amplifier. These back EMF's must be eliminated to prevent the unwanted switching of partially selected cores or the dissipation of the output signal in the formation of these back EMF's. In order to insure that the maximum output signal be provided to the output windings, it is necessary to provide a high impedance path for possible back EMF's while providing a low impedance path for the output windings. The aforesaid permits the largest part of the developed output signal to appear at the output of the array. The high impedance is provided by including an inductance coil 110 in the selection lines, between the lines and the source of potential E. For the selection flip-flops, which have reached their stable steady state condition, the inductance appears only as a low value DC resistance permitting the flip-flops to be of a low power variety. However, for any induced back EMF's, developed as a result of the switching of any core, the reactance of the inductance coil 10 will provide a high impedance path permitting little current to flow in the selection windings and permitting most of the current to be applied to the output windings.

While there have been shown and described and pointed out the fundamental novel feature of the invention as applied to the preferred embodiments, it is understood that various omissions and substitutions and changes of the form and details of the devices illustrated, and in their operation may be made by those skilled in the art, without departing from the spirit of the invention.

The embodiments of the invention in which an exclusive property or privilege is claimed are defined as follows:

1. A magnetic switch comprising a plurality of switching elements, each switching element capable of being magnetized in either of two stable magnetic remanent states; a bias means coupled to all of said switching elements for applying a bias signal to said switching element tending to place said switching elements in a bias state; a plurality of selectively operable flip-flops couple to said switching elements for providing selection signals to said selected ones of said switching elements whereby the switching elements receiving said selection signals are held in a first one of said two stable magnetic remanent states and those not receiving said selection signals are held in said bias state; coupling means for connecting said selection devices in series with said bias means; a first selectively operable control amplifier means coupled to said switching elements for providing first control signals to selected one of said switching elements to cause said switching elements which have been held at said first stable magnetic remanent state to switch to the second of said two stable magnetic remanent states; a second selectively operable control amplifier means coupled to said switching elements for providing second control signals to selected ones of said switching element to cause switching elements which have been switched to said second stable magnetic remanent state to be switched to said first stable magnetic remanent state; and a third control means coupled to said selection devices and to said first and second control means for activating said selection devices and said first and second control means in sequence; and a pluarlity of output means, each connected to a separate one of said switching elements to produce an output when its associated switching element is switched to said second stable magnetic remanent state.

2. A device as claimed in claim 1, wherein said flip-flops have accurately held lower current output limits and said first and second control amplifiers have accurately held lower current output limits.

3. A magnetic switch comprising a plurality of switching elements, each element capable of being magnetized in either of two stable magnetic remanent states; a bias means coupled to all of said switching elements for applying a bias signal to said switching elements tending to place said switching element in a bias state; first and second flip-flop selection devices, and a third selectively operable amplifier selection device coupled to said switching element for providing selection signals to selected ones of said switching elements whereby the switching elements receiving selection signals from said first and second selectively operable selection devices are held in a first one of said two stable magnetic remanent states and those not receiving said selection signals from said first and second selectively operable selection devices are held in said bias state; coupling means for connecting said first and second selectively operable selection devices in series with said bias means; said third selectively operable selection device being operable to cause said switching elements which have been held at said first stable magnetic remanent state to switch to the second of said two stable magnetic states; a fourth selectively operable amplifier switching device coupled to said switching elements for providing selection signals to selected ones of said switching elements to cause switching elements which have been switched to said second stable magnetic remanent state to be switched to said first stable magnetic remanent state; and a first control means coupled to said selection devices for activating said selection devices according to a predetermined sequence; and a plurality of output means, each connected to a separate one of said switching elements to produce an output when its associated switching element is switched to said second stable magnetic remanent state.

4. A device as claimed in claim 3, wherein said first and second flip-flop selection devices have accurately held lower current output limits and said third and fourth amplifier selection devices have accurately held lower current output limits.

5. A magnetic switch comprising a plurality of switching elements, each switching element capable of being magnetized in either of two stable magnetic remanent states; a plurality of selectively operable flip-flop selection devices having accurately held lower current output limits coupled to said switching elements for providing inhibiting signals to selected ones of said switching elements whereby the selected switching elements are retained in one of said two stable magnetic remanent states and the unselected switching elements are driven to saturation by said inhibiting signals; a potential source adapted to be connected to said selection devices; a low impedance reactive element connecting said potential source in series with said selection devices; first selectively operable flip-flop control means having accurately held upper and lower current output limits coupled to said switching elements for providing first control signals to selected ones of said switching elements to cause said switching elements which had been retained in said one magnetic remanent state to be switched to the second of said two stable magnetic remanent states; and plurality of output means, each connected to a separate one of said switching elements to produce an output when its associated switching element is switched to said second stable magnetic remanent state.

6. A magnetic switch comprising a plurality of switching elements, each switching element capable of being magnetized in either of two stable magnetic remanent states; first and second selectively operable flip-flop selection devices having accurately held lower current output limits coupled to said switching elements for providing inhibiting signals to unselected ones of said switching elements whereby said unselected switching elements are driven to saturation and for providing no signals to selected switching elements whereby said selected switching elements are retained in one of said two stable magnetic remanent states; a potential source adapted to be connected to said first and second selection devices; a low impedance reactive element connecting said potential source in series with said first and second selection devices; a third selectively operable amplifier selection device having accurately held lower current output limit coupled to said switching elements for providing selection signals to said selected ones of said switching elements to cause said switching elements which have been retained in said one magnetic remanent state to bes witched to the second of said two stable magnetic remanent states; and a plurality of output means, each connected to a separate one of said switching elements to produce an output when its associated switching element is switched to said second stable magnetic remanent state.

References Cited

UNITED STATES PATENTS

| | | | |
|---|---|---|---|
| 2,734,182 | 2/1956 | Rajchman | 307—88 X |
| 2,884,622 | 4/1959 | Rajchman | 307—88 X |
| 2,912,679 | 11/1959 | Bonorden | 340—17 |
| 2,913,596 | 11/1959 | Ogle | 340—17 |
| 2,971,181 | 2/1961 | Vogl | 340—17 |
| 3,205,369 | 9/1965 | Eachus | 307—88 |

JAMES W. MOFFITT, Primary Examiner

U.S. Cl. X.R.

340—174